US011699116B2

(12) United States Patent
Jou et al.

(10) Patent No.: US 11,699,116 B2
(45) Date of Patent: Jul. 11, 2023

(54) SYSTEM AND METHOD FOR CUSTOM SECURITY PREDICTIVE METHODS

(71) Applicant: Interset Software, Inc., Santa Clara, CA (US)

(72) Inventors: Stephan Jou, Richmond Hill (CA); Mario Daigle, Ottawa (CA); Shaun Pilkington, Ottawa (CA); Michael John Cyze, Kincardine (CA); Josh Mahonin, Ottawa (CA); Wesley Lawrence, Ottawa (CA)

(73) Assignee: Interset Software Inc., Santa Clara, CA (US)

(*) Notice: Subject to any disclaimer, the term of this patent is extended or adjusted under 35 U.S.C. 154(b) by 314 days.

(21) Appl. No.: 16/385,128

(22) Filed: Apr. 16, 2019

(65) Prior Publication Data

US 2019/0318203 A1 Oct. 17, 2019

Related U.S. Application Data

(60) Provisional application No. 62/658,228, filed on Apr. 16, 2018.

(51) Int. Cl.
| | | |
|---|---|---|
| *G06F 3/048* | (2013.01) | |
| *G06Q 10/0635* | (2023.01) | |
| *G06N 20/20* | (2019.01) | |
| *G06F 21/56* | (2013.01) | |
| *G06F 3/0482* | (2013.01) | |
| *G06F 21/57* | (2013.01) | |
| *G06F 18/214* | (2023.01) | |
| *G06F 18/2321* | (2023.01) | |

(52) U.S. Cl.
CPC ....... *G06Q 10/0635* (2013.01); *G06F 3/0482* (2013.01); *G06F 18/2148* (2023.01); *G06F 18/2321* (2023.01); *G06F 21/566* (2013.01); *G06F 21/577* (2013.01); *G06N 20/20* (2019.01)

(58) Field of Classification Search
CPC ........ G06N 20/00; G06N 20/20; G06N 5/003; G06N 5/04; G06N 5/025; G06N 7/005; G06N 3/08; G06N 3/082; G06F 21/602; G06F 21/566
See application file for complete search history.

(56) References Cited

U.S. PATENT DOCUMENTS

| | | | | |
|---|---|---|---|---|
| 5,692,107 A * | 11/1997 | Simoudis | ............... | G06N 5/025 706/12 |
| 8,160,977 B2 * | 4/2012 | Poulin | ................... | G06Q 10/04 706/21 |
| 8,250,009 B1 * | 8/2012 | Breckenridge | ........ | G06N 20/00 706/14 |
| 8,311,967 B1 * | 11/2012 | Lin | ........................ | G06N 20/00 706/45 |
| 8,370,279 B1 * | 2/2013 | Lin | .......................... | G06N 5/02 706/12 |
| 8,370,280 B1 * | 2/2013 | Lin | ........................ | G06N 20/00 706/12 |

(Continued)

*Primary Examiner* — Steven B Theriault
(74) *Attorney, Agent, or Firm* — Sheridan Ross P.C.

(57) ABSTRACT

A system and method is described for providing custom predictive models for detecting electronic security threats within an enterprise computer network. The custom models may be defined in a declarative language. The custom models, along with native models, may be combined together to provide custom machine learning (ML) use cases.

21 Claims, 8 Drawing Sheets

(56) References Cited

U.S. PATENT DOCUMENTS

| | | | |
|---|---|---|---|
| 8,417,715 B1* | 4/2013 | Bruckhaus | G06Q 30/0202 707/758 |
| 8,438,122 B1* | 5/2013 | Mann | G06N 20/00 706/12 |
| 8,443,013 B1* | 5/2013 | Lin | G06Q 10/04 707/810 |
| 8,595,154 B2* | 11/2013 | Breckenridge | G06N 20/00 706/12 |
| 8,762,299 B1* | 6/2014 | Breckenridge | G06K 9/6227 706/12 |
| 8,977,720 B2* | 3/2015 | Meng | G06F 17/18 709/219 |
| 9,020,861 B2* | 4/2015 | Lin | G06N 5/02 706/11 |
| 9,189,747 B2* | 11/2015 | Mann | G06N 5/04 |
| 9,294,495 B1* | 3/2016 | Francoeur | H04L 63/1433 |
| 9,306,965 B1* | 4/2016 | Grossman | H04L 63/1425 |
| 9,641,544 B1* | 5/2017 | Treat | H04L 63/02 |
| 9,923,787 B2* | 3/2018 | Ngoo | H04L 43/065 |
| 10,050,985 B2* | 8/2018 | Mhatre | H04L 63/1416 |
| 10,366,346 B2* | 7/2019 | Achin | G06N 20/00 |
| 10,387,798 B2* | 8/2019 | Duggan | G06F 9/5055 |
| 10,397,255 B1* | 8/2019 | Bhalotra | H04L 63/1425 |
| 10,452,993 B1* | 10/2019 | Hart | G06F 16/13 |
| 10,515,313 B2* | 12/2019 | Kaplow | G06N 5/04 |
| 10,650,150 B1* | 5/2020 | Rajasooriya | G06N 7/005 |
| 10,735,470 B2* | 8/2020 | Vidas | H04L 63/20 |
| 10,754,959 B1* | 8/2020 | Rajasooriya | H04L 63/1433 |
| 10,810,512 B1* | 10/2020 | Wubbels | G16H 30/40 |
| 10,824,950 B2* | 11/2020 | Jain | G06N 20/00 |
| 10,848,515 B1* | 11/2020 | Pokhrel | H04L 63/1416 |
| 10,963,811 B2* | 3/2021 | Grehant | G06F 16/22 |
| 11,080,435 B2* | 8/2021 | Bourhani | G06F 8/34 |
| 2002/0183988 A1* | 12/2002 | Skaanning | G06N 7/005 703/2 |
| 2003/0088565 A1* | 5/2003 | Walter | G06K 9/6219 |
| 2005/0234688 A1* | 10/2005 | Pinto | G05B 17/02 703/6 |
| 2005/0234753 A1* | 10/2005 | Pinto | G06Q 30/02 700/44 |
| 2005/0234761 A1* | 10/2005 | Pinto | G06Q 10/063 705/7.28 |
| 2005/0234762 A1* | 10/2005 | Pinto | G06Q 30/02 700/44 |
| 2005/0234763 A1* | 10/2005 | Pinto | G06Q 30/0201 706/21 |
| 2008/0201116 A1* | 8/2008 | Ozdemir | G08B 21/0423 703/2 |
| 2013/0167231 A1* | 6/2013 | Raman | H04L 63/1416 726/23 |
| 2013/0179937 A1* | 7/2013 | Mont | G06F 21/577 726/1 |
| 2014/0149895 A1* | 5/2014 | Bardhan | G06F 16/283 715/763 |
| 2014/0245207 A1* | 8/2014 | Poulin | G05B 13/048 715/771 |
| 2014/0337971 A1* | 11/2014 | Casassa Mont | G06F 21/552 726/22 |
| 2014/0343955 A1* | 11/2014 | Raman | G16H 50/30 705/2 |
| 2015/0142713 A1* | 5/2015 | Gopinathan | G06Q 40/00 706/14 |
| 2015/0269383 A1* | 9/2015 | Lang | G06F 21/604 726/1 |
| 2016/0232457 A1* | 8/2016 | Gray | G06T 11/206 |
| 2016/0350671 A1* | 12/2016 | Morris, II | G05B 23/0229 |
| 2017/0019487 A1* | 1/2017 | Maheshwari | H04L 41/22 |
| 2017/0083572 A1* | 3/2017 | Tankersley | G06F 3/04847 |
| 2017/0091673 A1* | 3/2017 | Gupta | G06N 20/00 |
| 2017/0177309 A1* | 6/2017 | Bar-Or | G06F 8/34 |
| 2017/0185904 A1* | 6/2017 | Padmanabhan | G06N 5/04 |
| 2017/0286502 A1* | 10/2017 | Bar-Or | G06F 16/2423 |
| 2017/0286526 A1* | 10/2017 | Bar-Or | G06F 8/60 |
| 2017/0316052 A1* | 11/2017 | Marin | G06F 16/2433 |
| 2017/0329881 A1* | 11/2017 | Korada | G06Q 30/0251 |
| 2017/0330102 A1* | 11/2017 | Brush | G06N 5/025 |
| 2017/0344901 A1* | 11/2017 | Ronen | H04L 63/1425 |
| 2017/0351241 A1* | 12/2017 | Bowers | G05B 13/048 |
| 2017/0351511 A1* | 12/2017 | Bar-Or | G06F 8/34 |
| 2018/0012145 A1* | 1/2018 | Maurya | G06N 5/022 |
| 2018/0068220 A1* | 3/2018 | Shao | G06F 16/2465 |
| 2018/0165599 A1* | 6/2018 | Pete | G06N 5/02 |
| 2018/0165604 A1* | 6/2018 | Minkin | G06N 5/022 |
| 2018/0367561 A1* | 12/2018 | Givental | H04L 63/1408 |
| 2019/0012257 A1* | 1/2019 | Indurthivenkata | G06F 8/10 |
| 2019/0042286 A1* | 2/2019 | Bailey | G06F 9/45504 |
| 2019/0102554 A1* | 4/2019 | Luo | G06F 21/554 |
| 2019/0141079 A1* | 5/2019 | Vidas | H04L 63/20 |
| 2019/0149564 A1* | 5/2019 | McLean | H04L 63/1416 713/171 |

* cited by examiner

SYSTEM AND METHOD FOR CUSTOM SECURITY PREDICTIVE METHODS

CROSS-REFERENCE TO RELATED APPLICATIONS

This application claims priority from U.S. Provisional Application No. 62/658,228 filed Apr. 16, 2018 the entirety of which is hereby incorporated by reference for all purposes.

TECHNICAL FIELD

The current disclosure relates to predictive models for identifying security threats in an enterprise network, and in particular to systems and methods for providing custom predictive models and machine learning use cases for detecting electronic security threats within an enterprise computer network.

BACKGROUND

Machine learning using predictive models has two stages. First, a predictive model is trained and then the trained model may be used for scoring potential security threats. Training occurs when, given a data set, the predictive model algorithm learns to adapt its parameters to conform to the input data set provided. Scoring occurs when a fully trained predictive model is used to make predictions, such as to predict a risk score associated with a set of behaviors in the data set. There are two flavors of machine learning: on-line, where the training and scoring both happen automatically in software within the same environment, or off-line where the training is done separately from the scoring, typically through a manual process lead by a data scientist.

Most current security analytics solutions perform offline machine learning where model development and training is performed by a data scientist outside of the main product to allow insights such as, for example, "The average amount of data copied to a USB drive by employees is 2 GB." These models, once trained, are then deployed as scoring algorithms or simple threshold-based rules to provide security insights or alerts such as, for example "Alert me whenever an employee copies more than 5 GB of data to a USB drive". While these offline models may be useful, it is difficult or impossible to account for variances in the population at scale. For example, while the average amount of data copied to a USB drive may be 2 GB, an employee working in a data intensive area, for example video editing, may exceed this average continually.

In contrast to off-line training, on-line learning and scoring is done automatically in the security system without requiring human expertise. For example, the security system learns automatically the average amount of data copied to a USB drive by each individual employee. The security system can then determine how unusual it is for any given employee when they copy a specific amount of data to a USB key.

While on-line models can provide advantageous results, they may be more difficult for end users to create models that are adapted to their own needs.

BRIEF DESCRIPTION OF THE DRAWINGS

The present disclosure will be better understood with reference to the drawings, in which.

DETAILED DESCRIPTION

Figure 1:
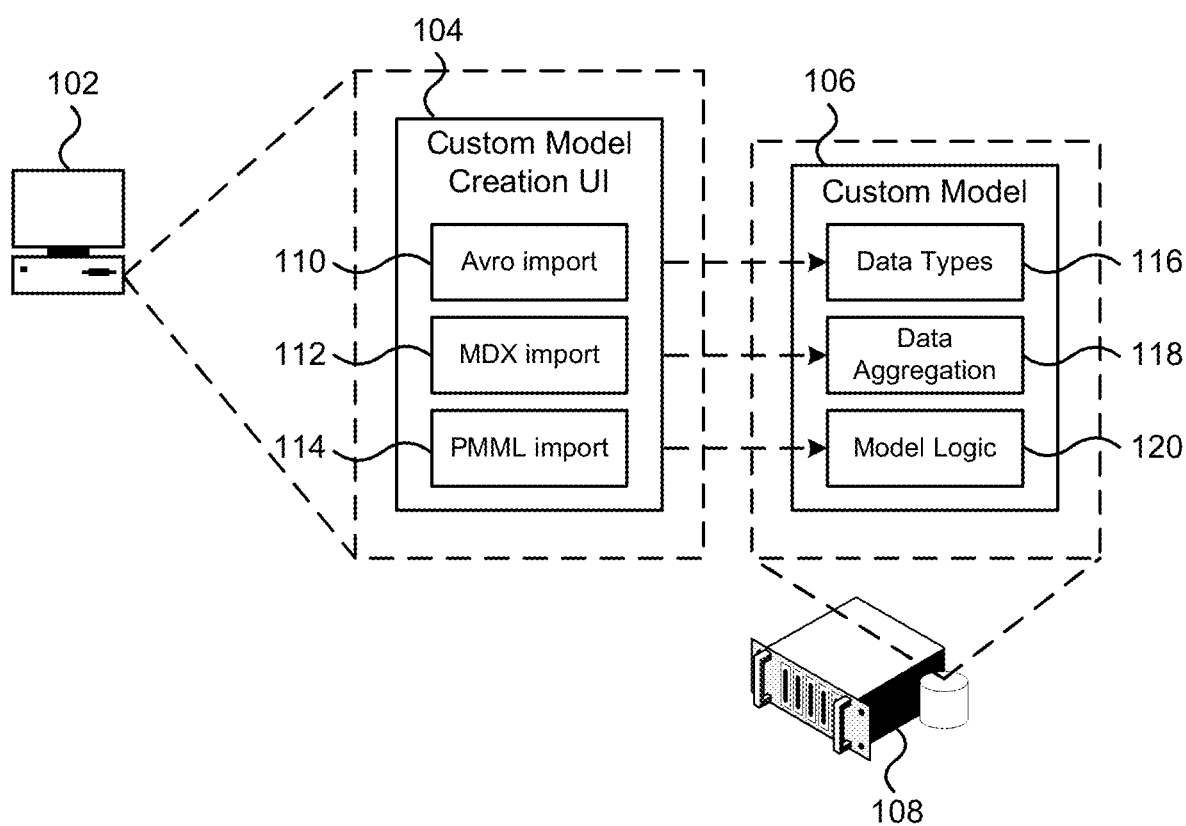
FIG. 1 depicts a system for creating custom models.

In accordance with the present disclosure there is provided a method of processing a custom predictive security model comprising: retrieving a custom predictive security model definition defining: input data from one or more available data sources providing security related information, the input data used in the predictive security model; and model logic providing a scoring function used to compute a predicted output value from the input data; ingesting, from the available data sources, the input data specified in the retrieved custom predictive security model; loading the ingested input data into the scoring function of the custom predictive security model; and outputting a predicted value from the scoring function based on the ingested input data.

In accordance with a further embodiment of the method, the custom predictive security model definition further defines one or more data aggregations to be applied to one or more input data, the method further comprises aggregating the input data according to the one or more data aggregations during ingestion.

In accordance with a further embodiment, the method further comprises processing one or more native models each of the native models providing a respective output predictive value based on ingested input data.

In accordance with a further embodiment, the method further comprises processing one or more supermodels, each of the supermodels specifying two or more models and one or more Boolean operators joining the two or more models to provide a predictive value for the supermodel.

In accordance with a further embodiment of the method, one or more of the supermodels further define one or more trigger conditions for triggering processing of the respective supermodel.

In accordance with a further embodiment, the method further comprises providing a user interface for creating the one or more supermodels comprising: trigger selection functionality for selecting one or more triggering events from available triggering events; model selection functionality for selecting one or more of available native models, custom models and supermodels; Boolean operator definition functionality for defining Boolean operators joining selected models; and output definition functionality for defining an output of the supermodel.

In accordance with a further embodiment, the method further comprises: creating one or more supermodels using the user interface for creating the one or more supermodels; and storing the created one or more supermodels.

In accordance with a further embodiment, the method further comprises providing a user interface for creating the one or more custom models, the user interface comprising: import functionality for importing a data schema; and import functionality for importing model logic.

In accordance with a further embodiment of the method, the import functionality for importing model logic imports model logic is defined using Predictive Model Markup Language (PMML).

In accordance with a further embodiment, the method further comprises: creating one or more custom models using the user interface for creating the one or more custom models; and storing the created one or more custom models.

In accordance with the present disclosure there is provided a computing system for processing a custom predictive security model comprising: a processor for executing instructions; a memory storing instructions, which when executed by the processor configure the computing system to: retrieve a custom predictive security model definition defining: input data from one or more available data sources providing security related information, the input data used in the predictive security mode; and model logic providing a scoring function used to compute a predicted output value from the input data; ingest, from the available data sources, the input data specified in the retrieved custom predictive security model; load the ingested input data into the scoring function of the custom predictive security model; and output a predicted value from the scoring function based on the ingested input data.

In accordance with a further embodiment of the computing system, the custom predictive security model definition further defines one or more data aggregations to be applied to one or more input data, and wherein the instructions stored in memory, when executed by the processor, further configure the computing system to aggregate the input data according to the one or more data aggregations during ingestion.

In accordance with a further embodiment of the computing system, the instructions stored in memory, when executed by the processor, further configure the computing system to process one or more native models each of the native models providing a respective output predictive value based on ingested input data.

In accordance with a further embodiment of the computing system, the instructions stored in memory, when executed by the processor, further configure the computing system to process one or more supermodels, each of the supermodels specifying two or more models and one or more Boolean operators joining the two or more models to provide a predictive value for the supermodel.

In accordance with a further embodiment of the computing system, one or more of the supermodels further define one or more trigger conditions for triggering processing of the respective supermodel.

In accordance with a further embodiment of the computing system, the instructions stored in memory, when executed by the processor, further configure the computing system to provide a user interface for creating the one or more supermodels comprising: trigger selection functionality for selecting one or more triggering events from available triggering events; model selection functionality for selecting one or more of available native models, custom models and supermodels; Boolean operator definition functionality for defining Boolean operators joining selected models; and output definition functionality for defining an output of the supermodel.

In accordance with a further embodiment of the computing system, the instructions stored in memory, when executed by the processor, further configure the computing system to: create one or more supermodels using the user interface for creating the one or more supermodels; and store the created one or more supermodels.

In accordance with a further embodiment of the computing system, the instructions stored in memory, when executed by the processor, further configure the computing system to provide a user interface for creating the one or more custom models, the user interface comprising: import functionality for importing a data schema; and import functionality for importing model logic.

In accordance with a further embodiment of the computing system, the import functionality for importing model logic imports model logic is defined using Predictive Model Markup Language (PMML).

In accordance with a further embodiment of the computing system, the instructions stored in memory, when executed by the processor, further configure the computing system to: create one or more custom models using the user interface for creating the one or more custom models; and store the created one or more custom models.

In accordance with the present disclosure there is provided a non-transitory computer readable memory, storing instructions, which when executed by a processor of a computing system, configure the computing system to: retrieve a custom predictive security model definition defining: input data from one or more available data sources providing security related information, the input data used in the predictive security mode; and model logic providing a scoring function used to compute a predicted output value from the input data; ingest, from the available data sources, the input data specified in the retrieved custom predictive security model; load the ingested input data into the scoring function of the custom predictive security model; and output a predicted value from the scoring function based on the ingested input data.

It is desirable to allow a customer to customize security predictive models using in security products. For larger corporations, or other security product users, they may have their own data science teams. As a result, they have the technical ability to develop their own statistically valid machine learning models using data science tools such as SPSS™, R, Python™, etc. Additionally, some security product customers may have a need for a specific machine learning algorithm or model but are unable to share specific details or data sets with the security product producer. Although customers may have the data science teams needed to create statistically valid machine learning models, the may not have the required data engineering abilities for developing and deploying the model in a big data production deployment, as that often involves different technologies, skills and experiences.

As described further herein, it is possible to provide a system to allow data scientists to define a custom machine learning model using data science tools they are familiar with. The custom model can then be deployed into an on-line predictive security platform for additional customization and production deployment, all without involving any software engineers or any custom development. These custom models can be run in isolation or in combination with existing native models as an augmentation of an existing system.

Current solutions may require custom development (e.g. in Java™ or Scala™) by solution or product teams to add new models or algorithms to the set of available predictive models that can be trained and scored online. This means that the availability of new, custom predictive models require a new release of the underlying software. Further, the producer of the underlying software may analyze data to develop baselines of normal for entities across an organization and then surface behavioral anomalies. This is done out-of-the-box with hundreds of analytical models and for many users, and this approach is effective when paired with tuning. However, for certain customers, it is desirable to have a fast, easy, and flexible way to add new models by leveraging without having to have significant expertise in software development and deployment.

In addition to providing a system to allow data scientists to easily deploy new models into the predictive security system, the system also allows users, who may not be data scientists, to easily re-combine or customize both the existing native models, along with any custom models to provide machine learning use cases from the above, with an intuitive user experience (UX). The customized machine learning use cases, including the learning and scoring components of the customized machine learning use cases, can then be deployed and executed automatically by the system.

Current security solutions today have, at best, a UX to customize rules or policies which do not have a component of online machine learning and therefore do not need to handle the same underlying complexity. There is no security solution UX that allows customization of online predictive models that also does not require data science expertise.

FIG. 1 depicts a system for creating custom models. The system 100 includes one or more end-user computers 102 that provide a user interface for creating custom models 104. The generated custom models 106 may be stored in a database or other storage structure 108. The custom model creation user interface 104 allows a data scientist, security professional, or other user, to import different files that define different parts of the custom model. For example import functionality 110 may be used to import Apache Avro™ schema definitions for data types 116 of the custom model 106. Although FIG. 1 depicts the schema as being defined in the declarative language Avro, other languages may be used in defining the data type schema. If the custom model requires data aggregation, it can be specified using a declarative language such as Online Analytical Processing (OLAP) MultiDimensional eXpressions (MDX). The user interface may include MDX import functionality 112 for importing the data aggregation 118 requirements of the custom model 106. The data aggregation requirements may be specified in other declarative languages. The model logic, which defines a model's input columns, transformations, model algorithms, model parameters and output column, can be specified using a standard declarative language such as Predictive Model Markup Language (PMML). The model logic may be specified in other declarative languages. The user interface 104 may include PMML import functionality 114 for importing model logic 120 of the custom model.

Although FIG. 1 depicts various import functionality for importing definitions of different parts of a custom model, it is possible to provide additional or alternative user interfaces including functionality for defining rather than importing the different model components. Further, although the custom model is depicted as having particular components, it is possible for the custom models to define the same content in various ways. For example, the data aggregation component may be specified as part of the model logic. Further, while the data types, data aggregation and model logic components of the custom model are depicted as being stored together, it is possible for the different components to be stored separate from each other. For example, the data types may be stored in a data type library and the custom model logic, and possibly other components, may be stored in a custom model library.

Computer 102 and server 108 each comprise a processor, memory, non-volatile (NV) storage and one or more input/output (I/O) interfaces. The NV storage may provide for long term storage, even in the absence of power. The NV storage may be provided by a hard disk drive, a solid state drive or flash memory. The I/O interfaces may allow additional components to be operatively coupled to the host computers, which may include network interface cards, input control devices such as keyboard and mice as well as output devices such as monitors. The processors execute instructions stored in memory in order to configure the host computer 102 or server 108 to provide model creation and execution.

Figure 2:
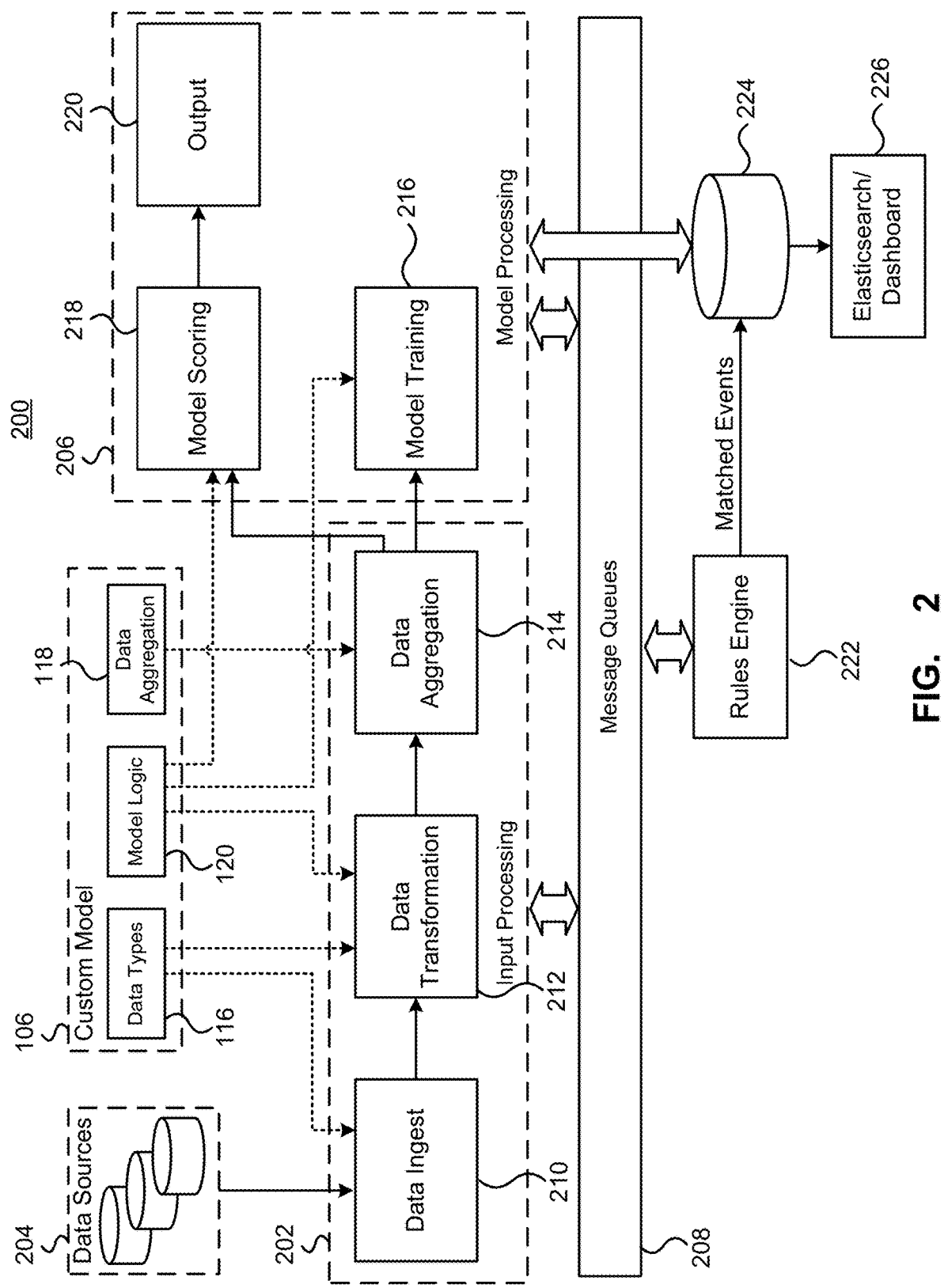
FIG. 2 depicts a system for processing custom models.

FIG. 2 depicts a system for processing custom models. The system 200 depicted in FIG. 2 allows custom models 106, as well as predefined native models, to be processed. The system 200 may be implemented by one or more servers. The system 200 includes input processing functionality 202 for processing input data from data sources 204 for the models, as well as model processing functionality 206 for processing the input data according to the model logic. Components of the input processing functionality and components of the model processing functionality may use message queues 208 to communicate. For example different Apache kafka™ queue topics may be used for ingested data, transformed data, aggregated data, model outputs, etc.

As depicted, different model components 116, 118, 120 may define the operation of the different components of the input processing 202 and model processing 206.

Although only a single custom model is depicted, a number of custom models and native models may be stored. As described above, the models may be stored separately from the data type definitions. A data store library may store the schema definitions for both native, built-in data types (e.g. Active Directory™ NetFlow, Perforce™ and other common, standard data types) and custom data types (e.g. output from a home-grown authentication system, output from a custom human resources (HR) database). As described above the data types for both native and custom data types may be specified using a standard declarative language, such as Apache Avro™ or a set of named column identifiers and column types. A model library may store the definitions for a model's input columns, transformations and aggregations, model algorithms, model parameters, and output column. A model's input columns, transformations, algorithms, parameters and output columns can be specified using a standard declarative language, such as Predictive Model Markup Language (PMML). A model's associated aggregation requirements can be specified using a standard declarative language, such as OLAP MDX.

Data ingest functionality 210 interfaces with the raw data sources 204 and ingests the data for processing, for both native and custom models. The data sources 204 provide security related information that is useful for detecting electronic security threats within an enterprise computer network. The data sources may include for example, Active Directory sources, NetFlow sources, Perforce sources, building access systems, human resources information system (HRIS) sources as well as other data sources that provide information that may provide insight into potential security risks to an organization. Metadata required for data ingest of a custom data source is read from the Data Types Library. During the data ingest, raw data can be cleaned and normalized. The ingested data may be stored to a message queue.

Data transformation functionality 212 performs row-level transformations, if required, of the incoming data, to result in additional columns to be added to the row. This is sometimes required to generate the appropriate inputs into a model. For example, a predictive model may require the logarithm of a column's value, rather than the actual value itself. A special case of data transformation is to take the values of the row and use them as input into a predictive model from the model library, to create additional columns to be added to the row which are actually predictions. This is sometimes described as "data enrichment". For example, a predictive model may look at the metadata associated with a network flow record, and predict the most probable network protocol associated with that flow record. As another example, a predictive model may look at a DNS record, and predict whether this is a malicious connection using a Domain Generation Algorithm (DGA). Metadata required for all data transformations may be read from the model library (for example, PMML supports data transformation specifications).

Data aggregation functionality 214 performs aggregation operations if required across collections of rows, to result in aggregate values that are sometimes required as inputs into a model. For example, a predictive model may require the total sum of a column's value for every hour or day in the dataset. Metadata required for all data aggregation may be read from the Model Library (for example, the use of MDX may be used to describe the required aggregations).

Model training functionality 216 performs any model training, if required. Metadata to describe the model training algorithms be may read from the Model Library (for example, the use of PMML may be used to enumerate the model algorithms). Examples of machine learning model algorithms include logistic regression and neural networks.

Model scoring functionality 218 performs any model scoring, which outputs predictions from the models that may then be used to automate system responses depicted schematically as output functionality 220, such as to automatically generate tickets in an incident response management system to investigate a high risk machine that was detected from a custom model. The scoring function may be read from the model library (for example, the model scoring function is described in a PMML file). This may be implemented, for example, using a PMML library that executes the scoring function across an Apache Spark™ cluster.

It can be appreciated that the system above is useful even with a subset of the components. For example, if no data transformations, data aggregation, or model training is required, the system continues to provide utility with just data ingest and model scoring capabilities.

In addition to the predictive analytics models described above, the system 200 may include a rules engine 222 for processing data. The rules engine may output events that match one or more rules. The matched events may be stored for example using Apache HBase™ or other data store 224. The matched events may be used as triggers for the model processing. The stored events may be synched to other systems including for example Elasticsearch™ for presentation to users 226. As another example, the rules engine may be used to trigger automated responses to specific predictive events, such as to quarantine a machine from the network when a malicious DNS query has been predicted.

Figure 3:
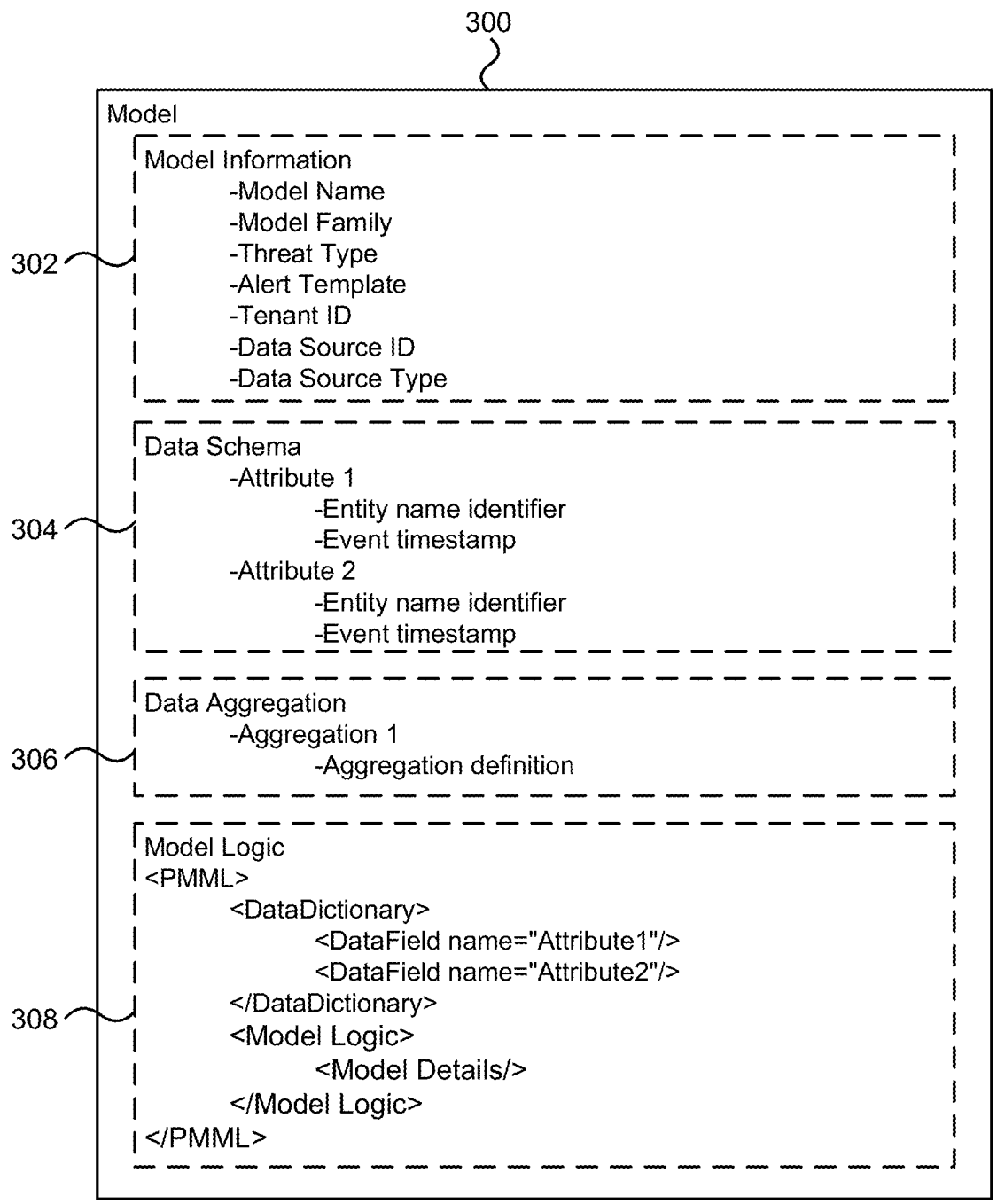
FIG. 3 depicts a data structure of a model.

FIG. 3 depicts a data structure of a model. The data structure 300 may be used to store both native and custom models. Native models may be considered as those models that are created by the developers of the security software while custom models may be created by end users, or other third parties. It will be appreciated that while a particular example of the model data structure 300 is depicted in FIG. 3, the models and associated information may be defined and stored in many different formats. The model 300 includes model information 302 that is used to incorporate the model into security software application and may include information such as the model name, model family which may be used to indicate a group or family of models that the model is part of, threat type which provides an indication of the type of threat the model identifies, alert template which may specify a template used for alerts that are raised by the current model, a tenant ID that may identify a particular tenant associated with the model, which may be beneficial for multi-tenant deployments, a data source identifier identifying one or more data sources used by the model as well as data source type information identifying the type of the data sources used by the model. The model 300 may also define a data schema 304 used by the model. The data schema 304 defines the attributes and/or fields that are used by the model. The data schema in FIG. 2 depicts two attributes. While the attributes of the data schema may vary, each includes an entity name identifier and a timestamp for each event. The model 300 may also define data aggregation details 306. For example, if data is to be aggregated, the particulars on how the data is to be aggregated can be defined. Zero or more aggregations can be specified that each define a particular aggregation including at least one attribute, potentially with a formula, an aggregation or rollup rule specifying how the one or more attributes are to be aggregated and a dimension through which to perform the aggregation. As an example, if Attribute 1 were failed login attempts, Aggregation 1 may be defined to count the number of failed login attempts. In such an aggregation, the attribute would be Attribute 1, the aggregation or rollup rule would be to COUNT, or possibly SUM, and the dimension could be for example per day. The aggregation definition may be specified using an OLAP specification, such as MDX.

The model 300 also comprises model logic 308 that specifies the particular logic used by the model. As depicted the, model logic 308 may be specified using a predictive model markup language (PMML) although the logic may be specified in other ways as well. Regardless of how the model logic is specified, it defines the particular predictive models or rules that are used to provide the model output. The model logic may define the attributes used by the model as well as the model logic and possibly training or configuration information for the model. The attributes specified in the model logic correspond to the attributes or fields specified in the data schema. The model logic may be viewed as a predicate, p=f(x), where the model f is a characteristic function of a probability distribution that may return, for example, a probability in [0,1], along with other useful predicates that are useful for security purposes such as predicting if an event has occurred within a particular time frame. Although a wide number of model logic algorithms may be used, examples include regression models, neural networks, support vector machines (SVM), clustering models, decision trees, naïve Bayes classifiers as well as other model algorithms. Predictive model predicates may be described using PMML or other suitable languages. Other model predicates may be described in the model logic using any standard grammar, such as tokens described via a Backus-Naur Form (BNF) notation.

Figure 4:
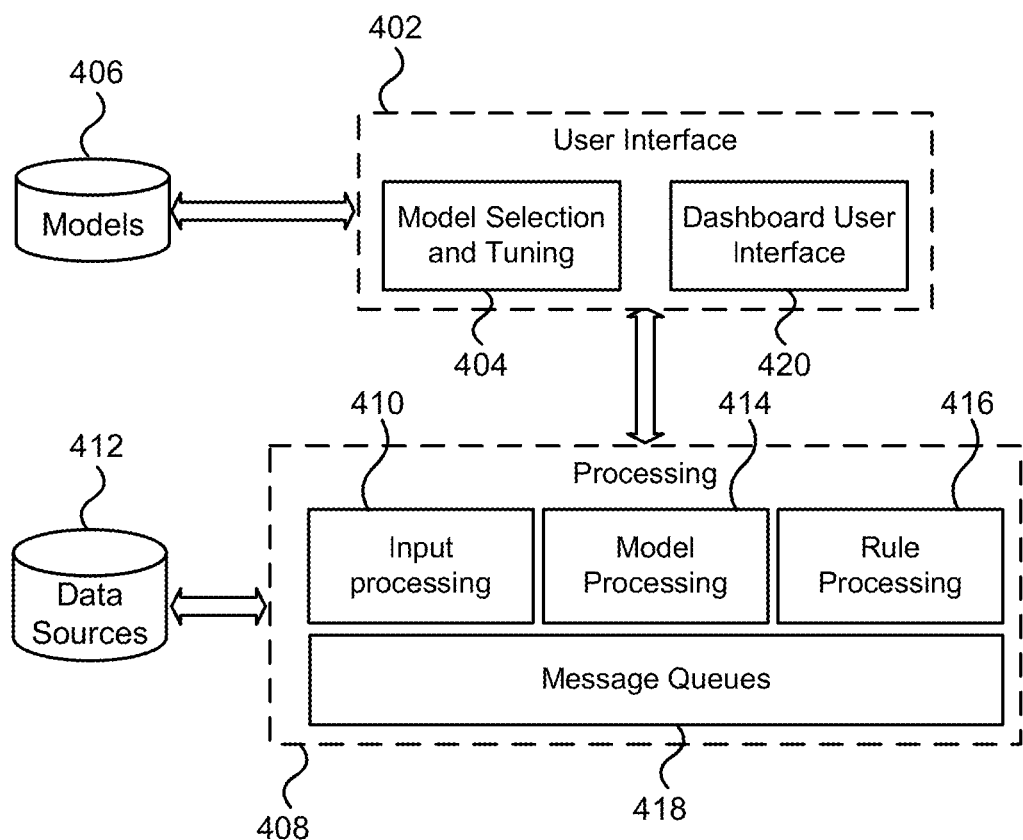
FIG. 4 depicts a system for processing custom models.

FIG. 4 depicts a system for using custom models. The system 400 may be implemented on one or more servers as well as possibly one or more end user devices. The system 400 includes a user interface 402 that includes model selection and tuning functionality 404 that allows one or more available models 406 to be selected, any tuning parameters specified, and loaded into the model processing functionality 404. The models, whether custom models or native models, may specify the input processing 406 applied to data sources 408, the model processing 410 applied to the ingested data as well as rule processing 412 for processing one or more rules. The processing components may be linked together through one or more message queues 414 or other communication interfaces.

Figure 5:
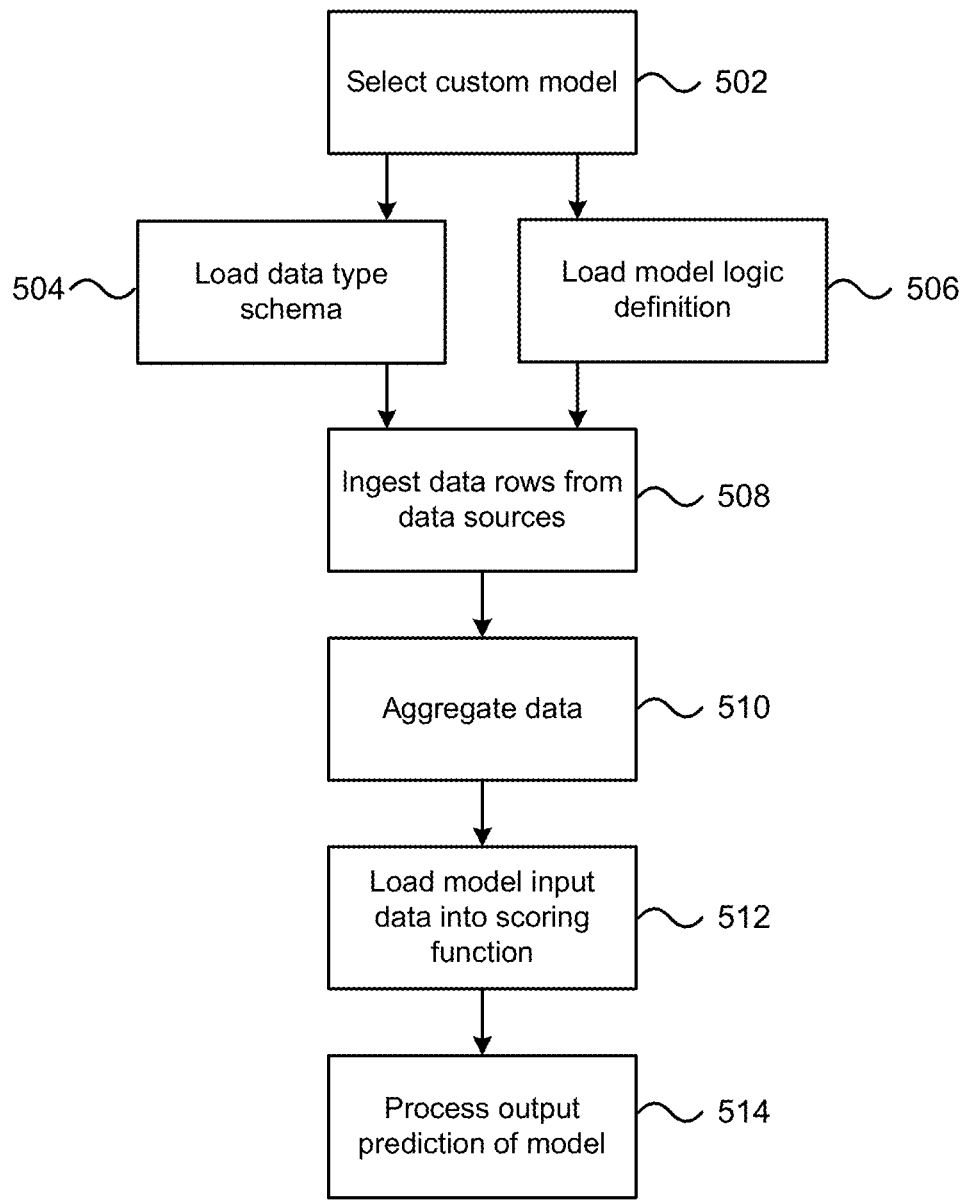
FIG. 5 depicts a method of processing a custom model.

FIG. 5 depicts a method of processing a custom model. The method 500 begins with selecting a model (502), which is depicted as being a custom model. The data type schema is loaded (504) from the Data Type Library which may use the information to ingest the data rows from the data sources. As the data rows are ingested they may be cleaned, and the data row columns normalized using the schema information from the Data Type library. The model definitions associated with the data source data type may be loaded (506) from the Model Library. As the data rows are ingested, optionally transform the data row columns using the model definition(s). After the data rows are ingested (508), the data rows may be aggregated (510) according to the model definition(s). The raw event and aggregated data that form the input values for the custom models are loaded into the custom models' scoring function (512), to compute the predicted output values from the custom models and the output of the predictive models may be processed (514).

The above has described the creation and processing of custom models. While creating custom models may be advantageous, it should be done by data scientists having the necessary knowledge to create statistically meaningful models. It is desirable to provide the ability for users without the required knowledge to create their own models using the available statistically valid models.

Figure 6:
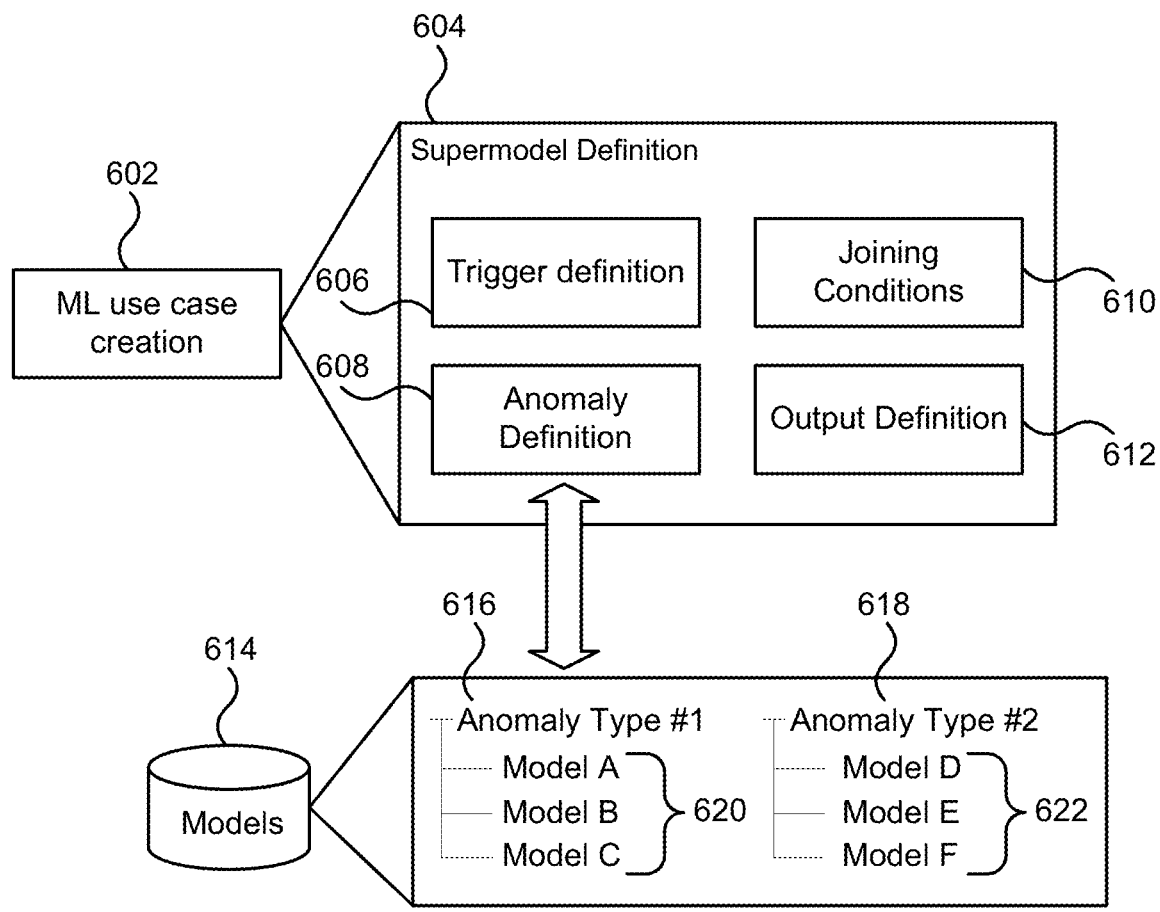
FIG. 6 depicts a further system for creating custom machine learning use cases.

FIG. 6 depicts a further system for creating custom models. The system 600 allows a user to create custom machine learning (ML) use cases from existing models. ML use cases creation functionality 602 allows a user to define an ML use case 604. The ML use case definition 604 may include one or more trigger event definitions 606, one or more anomaly definitions 608 and joining conditions 610 for combining the triggers and models together. The ML use case definition 604 also provides an output definition 612 specifying the output of the ML use case.

Models may be selected from the model store 614. The models may be grouped together into different model types or families. For example, for anomaly models, as depicted, different anomaly types or families 616, 618 may be determined using different models 620, 622. For example, in a cybersecurity application, an anomaly model of "employee is copying an unusual amount of data" may be determined by different models, including for example a model that compares the employees' historical data copying amounts, and another model that compares the amount to other employees in the same department. In selecting an anomaly type, the underlying models of the selected anomaly type may be used and combined together with underlying models of other selected anomaly types. The joining conditions may specify Boolean operators for combining the different anomaly models of the selected anomaly type and trigger events together. The output definition may provide a new type of custom anomaly. New trigger events may fire from a rules engine, such as Storm™. The combined models provide an ML use cases that may aggregate on any number of "model families" or types and/or trigger events generated from a rules engine.

Figure 7:
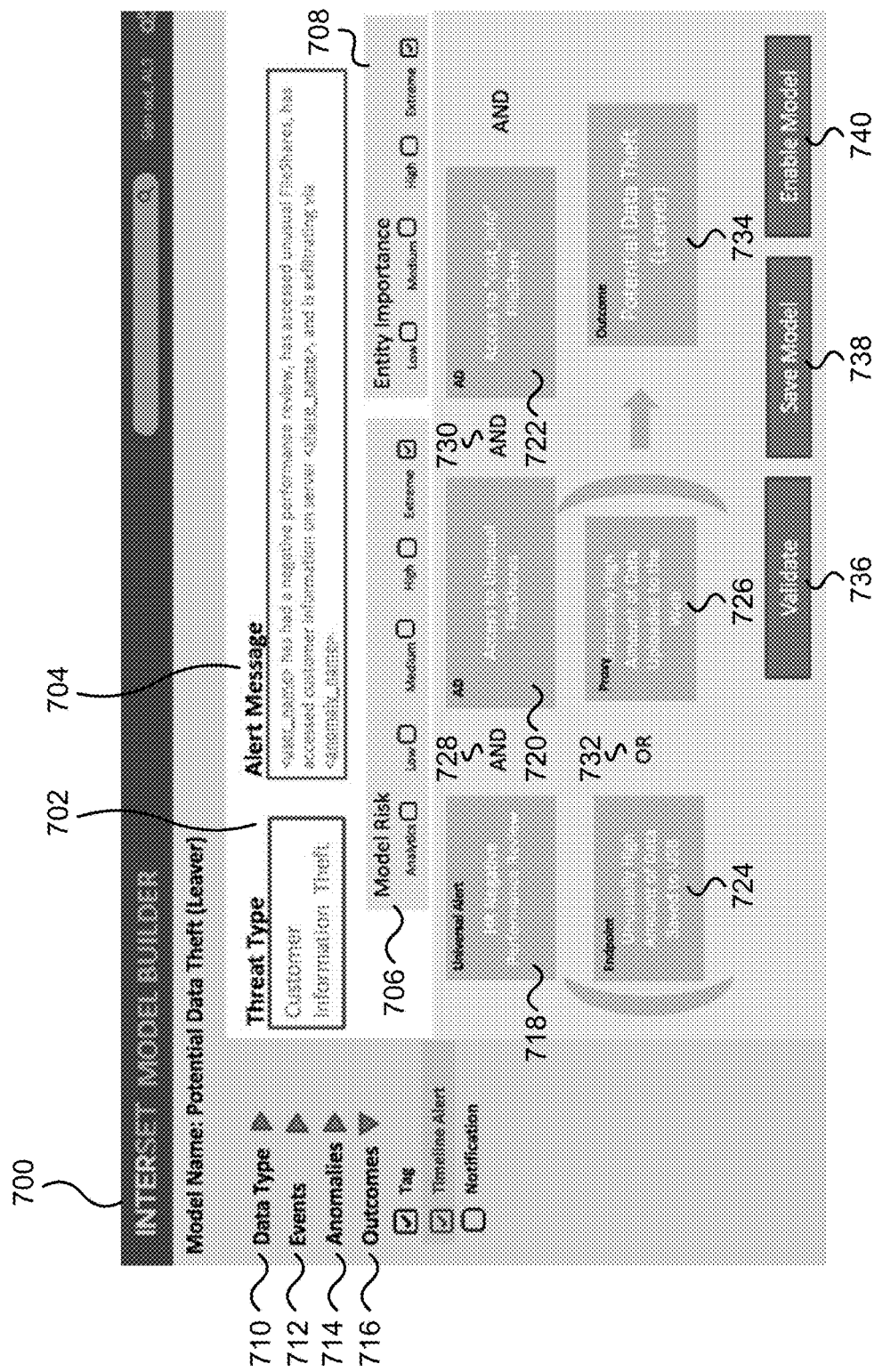
FIG. 7 depicts a user interface for creating custom machine learning use cases.

FIG. 7 depicts a user interface for creating custom ML use cases. For a cybersecurity application, the user interface 700 may allow a threat type of the ML use case to be specified 702 along with an alert message 704. The risk level 706 associated with the model may be specified along with entity importance levels 708. Other ML use cases characteristics may also be specified. The user interface may provide a means for selecting different data types 710, events 712, anomalies 714 and outcomes 716. The anomalies may be selected by the anomaly family and the underlying models combined in the ML use case. Selected models, whether existing native models or custom models, and events may be presented graphically 718, 720, 722, 724, 726 along with indications of how the selected anomalies and events are combined together 728, 730, and 732 in the ML use case. The outcome 734 of the ML use case may be depicted schematically in the user interface. The created ML use case may be validated 736 and saved 738. The interface may include functionality to enable 740 a created supermodel.

Figure 8:
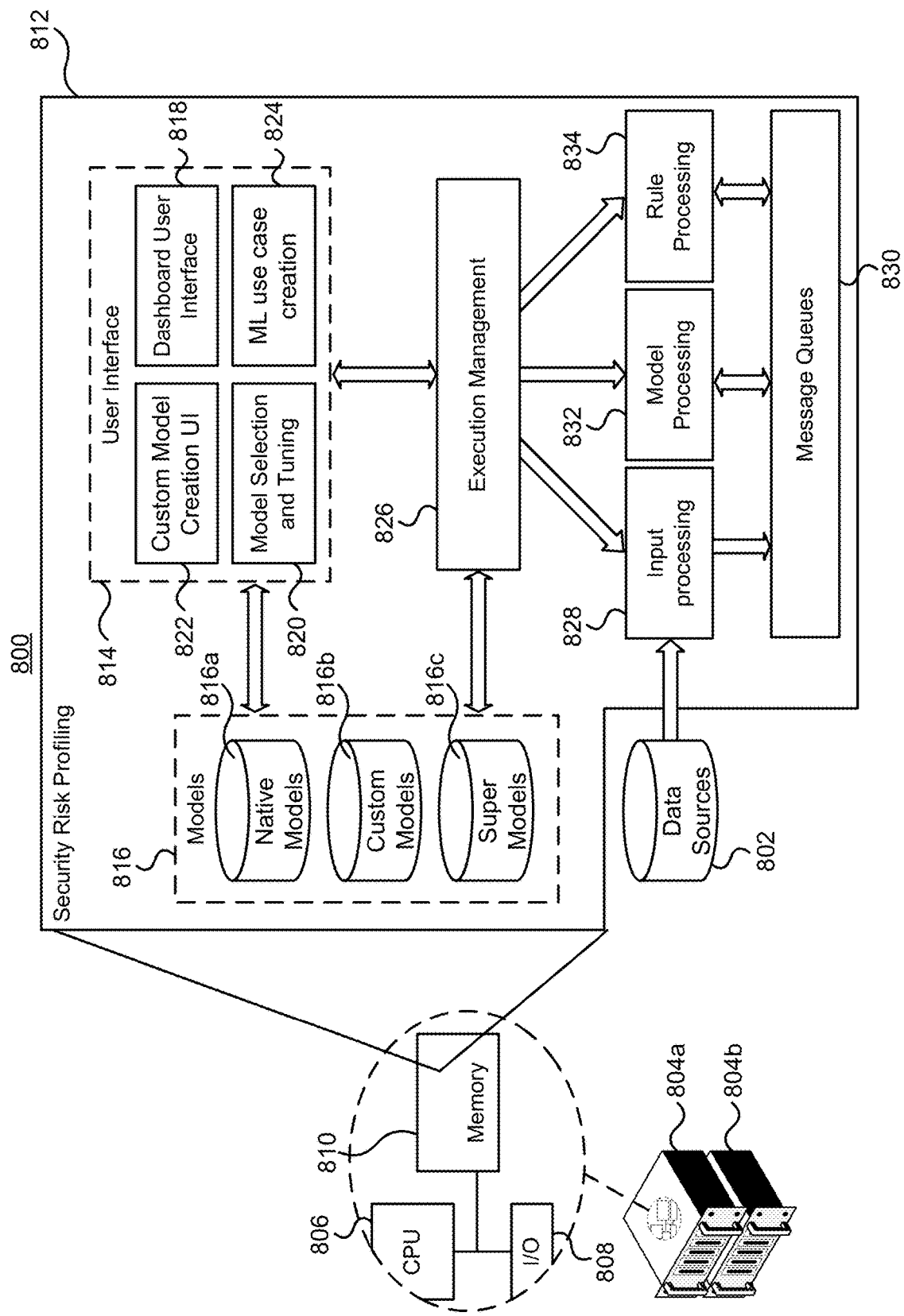
FIG. 8 depicts a further system for processing models.

FIG. 8 depicts a further system for processing models. As described in further detail below, the system 800 provides a user interface for interacting with, and viewing the results of, various security models. The system 800 may receive data from a plurality of data sources 802. The data may be provided in real time, periodically, in batches or retrieved as needed. The data sources may include for example, Active Directory (AD) information, firewall information, human resources information system (HRIS) information, building security information, etc. One or more computer devices 804a, 804b may be used to provide the security application, which may evaluate security risks using various predictive models. The computing devices 804a, 804b include one or more processors 806 for executing instructions. One or more input/output (I/O) interfaces 808 allow additional devices to be operatively coupled to the processor(s) 806. The I/O interface(s) 808 may be coupled to, for example a network interface, keyboard/mice input, displays, etc. The computing devices 804a, 804b further include memory 810 that store data and instructions. The memory 810 may include both volatile and non-volatile non-transitory media. The data and instructions stored in memory 810, when executed by the processor(s) 806 configure the computing devices 804a, 804b to provide security risk profiling functionality 812.

The security risk profiling functionality 812 provides user interface functionality 814 that allows end users to interact with various potential risk models 816. As depicted, the models may include native models 816a that are provided as part of the security risk profiling functionality, custom models 816b that are defined by end users or other third parties. The user interface functionality 814 may include dashboard user interface functionality 818 that displays results of the processed models to end an end user. The dashboard interface presented by the dashboard user interface allows end users to investigate potential security risks based on the results of processing one or more of the models 816. For example, a model may indicate that a particular user is a high risk of potential data theft. The interface functionality 814 may further comprise model selection and tuning functionality 820 that allows an end user to select one or more models to execute, or process. The selection of the models may be provided in various ways, including for example listing all available models, subsets of models, predefined listing or groupings of models or other ways of selecting models. The model selection may allow the user to select any of the native models 816a, custom models 816b or super models 816c. The model selection and tuning functionality 820 may also allow an end user to tune or configure selected models. For example, parameter values, thresholds or other settings of the selected models may be set or adjusted. The user interface functionality 814 may also include custom model creation user interface functionality 822 allows an end user to create custom models. The custom model creation interface may allow the end-user to create the custom model in various ways including importing model functionality defined in other tools or languages. The custom model creation user interface functionality 822 allows end users who may be familiar with creating statistically valid predictive models but are not familiar with programming or otherwise creating models for the security risk profiling functionality 812 to easily import the predictive models they created with other tools or languages. The user interface functionality 814 may also provide machine learning use case creation interface functionality 824 that allows end user who may not be familiar with creating statistically valid models to create new use cases by selecting and combining existing models 816.

The security risk profiling functionality 812 may further comprise execution management functionality 826. The execution management functionality 826 may control the processing of selected models. The model selection and tuning functionality 820 may provide selected model(s), or an indication of the selected model(s), to the execution management functionality 826 which may configure the security risk profiling functionality 812 for processing the models. The models may be configured to be processed periodically, such as every hour, day, week, etc. or the models may be processed on demand when selected. The execution management functionality 826 may retrieve the data schema information, and possibly any aggregation information, from selected models and configures input processing functionality 828 in order to ingest, and aggregate if required, any input data required by the selected models. The input processing functionality 828 may store the ingested data for access by other functionality. For example, the input processing functionality 828 may pass the ingested data to a message queue 830. The execution management functionality 826 may also configure model processing functionality 832 as well as rule processing functionality 834 according to the model logic.

In addition to configuring the input processing functionality 828, the model processing functionality 832 and the rule processing functionality 834, the execution management 826 may also control the processing of supermodels 816c. As described above, supermodels may comprise a plurality of models that are joined together using Boolean operators. The execution management functionality 826 may receive a supermodel and configure the components according to the individual models of the supermodel. The execution management functionality 826 may combine the results from the individual models together according to the Boolean operators of the supermodel. The execution management functionality 826 may retrieve individual model results from the message queues 830 and combine the results together and store the output to the message queues.

The security risk profiling functionality 812 described above provides a system that allows the creation and execution of custom predictive models for use in detecting potential security risks within an organization. Additionally, the security risk profiling functionality 812 provides a system that allows end users to combine existing models together to create new machine learning use cases that may be used in identifying potential security threats.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

What is claimed is:

1. A method of processing a custom predictive security model comprising:
    retrieving, by a device, a custom predictive security model definition, selected from a model library, the custom predictive security model defining:
        input data from one or more available data sources providing security related information, the input data used in the custom predictive security model; and
        model logic providing a scoring function used to compute a predicted output value from the input data;
    retrieving, by the device, metadata associated with the custom predictive security model;
    ingesting, by the device and using the model logic, from the one or more available data sources, the input data specified in the retrieved custom predictive security model definition, wherein ingesting the input data comprises aggregating the input data based at least in part on one or more data aggregations defined in the custom predictive security model definition, wherein:
        the one or more data aggregations are defined based at least in part on the metadata; and
        the one or more data aggregations defined in the retrieved custom predictive security model definition comprise an indication of: one or more attributes to be aggregated using the custom predictive security model; and a dimension associated with aggregating the one or more attributes;
    loading, by the device, the ingested input data in the scoring function of the custom predictive security model; and
    outputting, by the device, a predicted value from the scoring function based on the ingested input data.

2. The method of claim 1, further comprising processing one or more native models, each of the native models providing a respective output predictive value based on ingested input data.

3. The method of claim 2, further comprising processing one or more supermodels, each of the supermodels specifying two or more models and one or more Boolean operators joining the two or more models to provide a predictive value for the supermodel, wherein one or more respective supermodels of the one or more supermodels further define one or more trigger conditions for triggering processing of the one or more respective supermodels.

4. The method of claim 1, wherein the model library stores definitions for the custom predictive security model, and wherein the definitions comprise the custom predictive security model definition.

5. The method of claim 3, further comprising: providing a user interface for creating the one or more supermodels comprising:
trigger selection functionality for selecting one or more triggering events from available triggering events;
model selection functionality for selecting one or more available native models, custom models and supermodels;
Boolean operator definition functionality for defining Boolean operators joining selected models;
output definition functionality for defining an output of the supermodel;
creating one or more supermodels using the user interface for creating the one or more supermodels; and
storing the created one or more supermodels.

6. The method of claim 1, wherein the scoring function is read from the model library.

7. The method of claim 1, further comprising providing a user interface for creating one or more custom predictive security models, the user interface comprising:
import functionality for importing a data schema; and
import functionality for importing model logic.

8. The method of claim 7, wherein the import functionality for importing model logic is defined using Predictive Model Markup Language (PMML).

9. The method of claim 8, further comprising:
creating the one or more custom predictive security models using the user interface for creating the one or more custom predictive security models; and
storing the created one or more custom predictive security models.

10. A computing system for processing a custom predictive security model comprising:
a processor for executing instructions;
a memory storing instructions, which when executed by the processor, configure the computing system to:
retrieve a custom predictive security model definition, selected from a model library, the custom predictive security model defining:
input data from one or more available data sources providing security related information, the input data used in the custom predictive security model; and
model logic providing a scoring function used to compute a predicted output value from the input data;
retrieve metadata associated with the custom predictive security model;
ingest, using the model logic, from the one or more available data sources, the input data specified in the retrieved custom predictive security model definition, wherein ingesting the input data comprises aggregating the input data based at least in part on one or more data aggregations defined in the custom predictive security model definition, wherein:
the one or more data aggregations are defined based at least in part on the metadata; and
the one or more data aggregations defined in the retrieved custom predictive security model definition comprise an indication of: one or more attributes to be aggregated using the custom predictive security model; and a dimension associated with aggregating the one or more attributes;
load the ingested input data in the scoring function of the custom predictive security model; and
output a predicted value from the scoring function based on the ingested input data.

11. The computing system of claim 10, wherein the instructions stored in the memory, when executed by the processor, further configure the computing system to process one or more native models, each of the native models providing a respective output predictive value based on ingested input data.

12. The computing system of claim 11, wherein the instructions stored in the memory, when executed by the processor, further configure the computing system to process one or more supermodels, each of the one or more supermodels specifying two or more models and one or more Boolean operators joining the two or more models to provide a predictive value for the supermodel.

13. The computing system of claim 12, wherein one or more respective supermodels of the one or more supermodels further define one or more trigger conditions for triggering processing of the one or more respective supermodels.

14. The computing system of claim 13, wherein the instructions stored in the memory, when executed by the processor, further configure the computing system to: provide a user interface for creating the one or more supermodels comprising:
trigger selection functionality for selecting one or more triggering events from available triggering events;
model selection functionality for selecting one or more of available native models, custom models and supermodels;
Boolean operator definition functionality for defining Boolean operators joining selected models; and
output definition functionality for defining an output of the supermodel.

15. The computing system of claim 14, wherein the instructions stored in the memory, when executed by the processor, further configure the computing system to:
create the one or more supermodels using the user interface for creating the one or more supermodels; and
store the created one or more supermodels.

16. The computing system of claim 10, wherein the instructions stored in the memory, when executed by the processor, further configure the computing system to provide a user interface for creating the one or more custom predictive security models, the user interface comprising:
import functionality for importing a data schema; and
import functionality for importing model logic.

17. The computing system of claim 16, wherein the import functionality for importing model logic is defined using Predictive Model Markup Language (PMML).

18. The computing system of claim 16, wherein the instructions stored in the memory, when executed by the processor, further configure the computing system to:
create the one or more custom predictive security models using the user interface for creating the one or more custom predictive security models; and
store the created one or more custom predictive security models.

19. A non-transitory computer readable memory, storing instructions, which when executed by a processor of a computing system for processing a custom predictive security model, configure the computing system to:
  retrieve a custom predictive security model definition, selected from a model library, the custom predictive security model defining:
    input data from one or more available data sources providing security related information, the input data used in the custom predictive security model; and
    model logic providing a scoring function used to compute a predicted output value from the input data;
  retrieve metadata associated with the custom predictive security model;
  ingest, using the model logic, from the one or more available data sources, the input data specified in the retrieved custom predictive security model definition, wherein ingesting the input data comprises aggregating the input data based at least in part on one or more data aggregations defined in the custom predictive security model definition, wherein:
    the one or more data aggregations are defined based at least in part on the metadata; and
    the one or more data aggregations defined in the retrieved custom predictive security model definition comprise an indication of: one or more attributes to be aggregated using the custom predictive security model; and a dimension associated with aggregating the one or more attributes;
  load the ingested input data into the scoring function of the custom predictive security model; and
  output a predicted value from the scoring function based on the ingested input data.

20. The non-transitory computer readable memory of claim 19, wherein the instructions, which when executed by the processor of the computing system, further configure the computing system to process one or more native models, each of the native models providing a respective output predictive value based on ingested input data.

21. The non-transitory computer readable memory of claim 19, wherein the instructions, which when executed by the processor of the computing system, further configure the computing system to process one or more supermodels, each of the one or more supermodels specifying two or more models and one or more Boolean operators joining the two or more models to provide a predictive value for the supermodel, wherein one or more respective supermodels of the one or more supermodels further define one or more trigger conditions for triggering processing of the one or more respective supermodels.

* * * * *